United States Patent
Suryanarayana et al.

(10) Patent No.: US 12,181,990 B2
(45) Date of Patent: Dec. 31, 2024

(54) FAIL-SAFE BOOT BLOCK TO DYNAMICALLY BOOT PLATFORM RESILIENCY FIRMWARE

(71) Applicant: Dell Products L.P., Round Rock, TX (US)

(72) Inventors: Shekar Babu Suryanarayana, Bangalore (IN); Ibrahim Sayyed, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 75 days.

(21) Appl. No.: 18/192,529

(22) Filed: Mar. 29, 2023

(65) Prior Publication Data
US 2024/0330135 A1  Oct. 3, 2024

(51) Int. Cl.
*G06F 11/00* (2006.01)
*G06F 11/22* (2006.01)

(52) U.S. Cl.
CPC ...... *G06F 11/2284* (2013.01); *G06F 11/2273* (2013.01)

(58) Field of Classification Search
CPC ............. G06F 11/2053; G06F 11/2094; G06F 11/2273; G06F 11/2284; G06F 21/572; G06F 21/575; G06F 9/4401; G06F 9/4403; G06F 9/4406; G06F 9/4408
See application file for complete search history.

(56) References Cited

U.S. PATENT DOCUMENTS

| | | | |
|---|---|---|---|
| 8,006,125 B1 * | 8/2011 | Meng .................. | G06F 11/1417 714/6.2 |
| 11,422,896 B2 * | 8/2022 | Kotary ................ | G06F 11/1433 |
| 2020/0042391 A1 * | 2/2020 | Pepper ................ | G06F 11/1417 |
| 2021/0240488 A1 * | 8/2021 | Suryanarayana ..... | G06F 9/4406 |

* cited by examiner

*Primary Examiner* — Michael Maskulinski
(74) *Attorney, Agent, or Firm* — Jackson Walker L.L.P.

(57) ABSTRACT

A disclosed fail-safe boot block method leverages embedded controller (EC) functionality to monitor power on self-test (POST) messages and, in response to detecting a POST error message, execute a sequence of main basic input/output system (BIOS) recovery operations including, in at least some embodiments, performing top-block swap recovery features supported by the platform. If the main BIOS recovery operations fail to resolve the POST error issue, e.g., fail to resolve a No Boot/No Post/No Video (NB/NP/NV) state of the platform, a resiliency boot block bit is set and a reset is executed to boot the platform, via a fail-safe boot block, into the safe BIOS mode for error analysis and corrective action. The fail safe boot block and the safe BIOS firmware may reside in a flash partition that is factory-programmed and sealed to prevent substantially any subsequent programming and/or of the storage device. Additional benefit of the fail-safe boot features are disclosed herein.

15 Claims, 4 Drawing Sheets

FAIL-SAFE BOOT BLOCK TO DYNAMICALLY BOOT PLATFORM RESILIENCY FIRMWARE

TECHNICAL FIELD

The present disclosure pertains to information handling system firmware and, more specifically, recovering from faulty firmware.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems execute a boot procedure following a system reset to initialize the system to a known state. Boot procedures may begin by executing code stored in a special purpose storage block referred to as an initial boot block (IBB). Boot procedures for commercially distributed systems and platforms generally execute some form of power on self-test (POST) early in the boot process, typically before establishing a basic input/output system (BIOS) image and/or loading an operating system.

When a POST returns an error, the system may support any of various recovery and/or mitigation tools for identifying and resolving the issue so that the system can proceed to load a main BIOS image, and load an operating system. Top-block swap is one known example of a recovery or mitigation feature. Top-block swap supports dual BIOS IBBs, a primary IBB and a secondary IBB. If the primary IBB is inaccessible or non-functional, a top swap bit may be set before executing a system reset to switch the BIOS entry point to the secondary IBB.

Nevertheless, due to the frequency of firmware updates and other reasons, a system may experience a POST error referred to herein as No Boot/No Post/No Video (NB/NP/NV). Reported NB/NP/NV errors may be attributable to various issues including, as examples, BIOS Boot Block corruptions that occur during update/recover, i.e., during flash write cycle, power failures, etc.

In addition, existing auto-heal features including, by way of example, 1 bit serial peripheral interface (SPI) feature, real time clock (RTC) auto heal, and the like, may help to start the BIOS boot process, but do not provide an end to end solution, i.e., resolve POST errors, when a universal extensible firmware interface (UEFI) driver image is corrupted. Auto heal attempts are generally local and focus on repairing the existing BIOS image, i.e., the image stored on a persistent memory device such as an SPI flash device or EFI system partition (ESP) partition and only when the system is in a bootable condition.

SUMMARY

Common problems associated with resolving POST errors are addressed by subject matter disclosed herein. In at least one aspect, a disclosed fail-safe boot block method leverages embedded controller (EC) functionality to monitor POST messages and, in response to detecting a POST error message, execute a predetermined or dynamically ascertained sequence of main BIOS recovery operations including, in at least some embodiments, performing top-block swap recovery features supported by the platform. If the main BIOS recovery operations fail to resolve the POST error issue, e.g., fail to resolve a NB/NP/NV state of the platform, a resiliency boot block bit is set and a reset is executed to boot the platform, via a fail-safe boot block, into the safe BIOS mode for error analysis and corrective action. The fail safe boot block and the safe BIOS firmware may reside in a flash partition that is factory-programmed and sealed to prevent the partition from being subsequently unlocked and/or overwritten. Additional benefit of the fail-safe boot features are disclosed herein.

In one aspect, disclosed systems and methods monitor POST messages of an information handling system and, responsive to detecting a POST error message indicative of a POST error condition including, as examples, a NB/NP/NV condition, execute a recovery sequence, which may include a sequence of conventional BIOS recovery operations. Responsive to determining that the recovery sequence did not resolve the POST error condition, a resiliency boot block bit is set and a reset is executed to boot the system to a safe BIOS mode by accessing safe platform firmware stored in a factory-written and factory-sealed partition, referred to herein as a resiliency partition, of an SPI or other type of firmware store. In the safe BIOS mode, the system may determine a failure stage of the main BIOS and take corrective action based on the failure stage. The monitoring of POST messages may be performed by an EC of the information handling system. The main BIOS recovery operations may include any one or more of: a memory built in self-test (MBIST) operation, a single bit SPI operation, and a top-block swap operation to switch a boot partition. Determining the failure stage of the main BIOS may include includes activating a UEFI telemetry program to obtain BIOS attribute data. Taking corrective action may include, as illustrative but non-limiting examples: fetching a latest BIOS version from a cloud-based store responsive to detecting a corrupted driver execution environment (DXE) driver, sending telemetry to a cloud store and requesting a memory module dispatch responsive to a runtime memory mapping handoff error, and sending telemetry to a cloud store and requesting a motherboard dispatch responsive to determining a hardware issue with an SPI device.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1A:
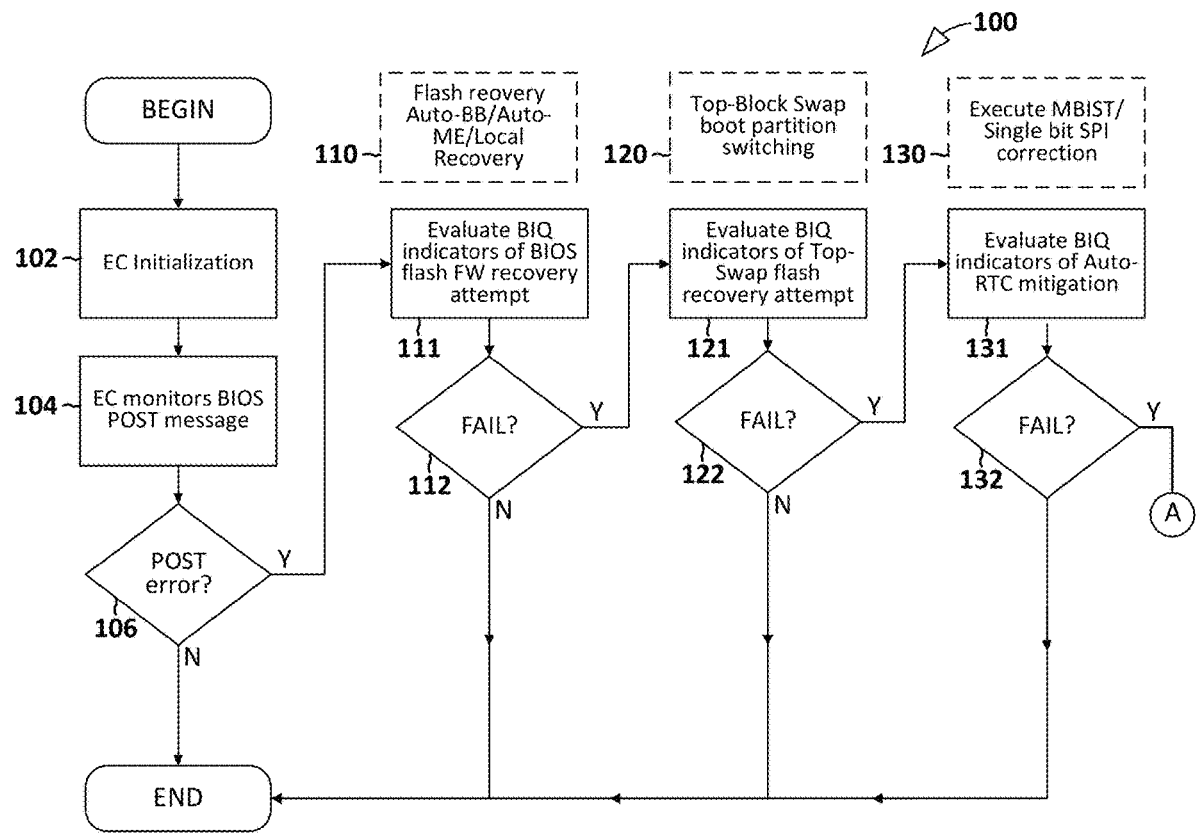
FIGS. 1A and 1B illustrate a flow diagram of a fail-safe boot method in accordance with disclosed teachings.
Figure 4:
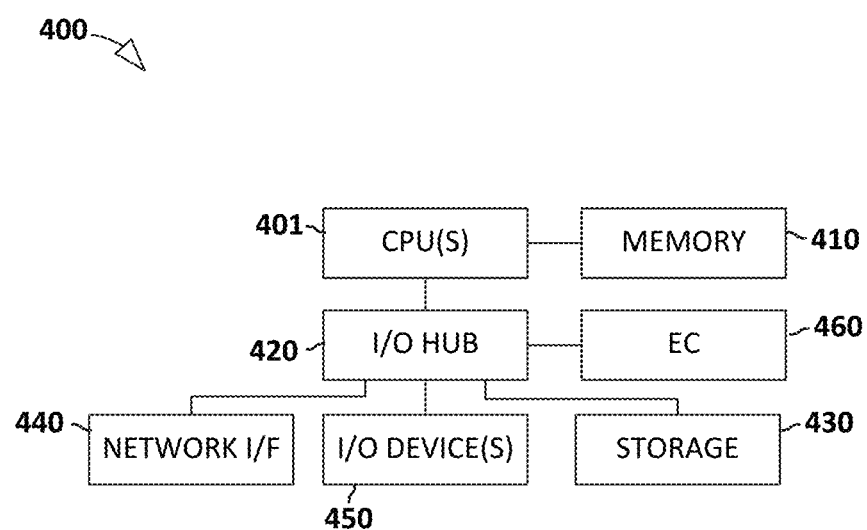
FIG. 4 illustrates an information handling system suitable for use in conjunction with subject matter disclosed in FIGS. 1A, 1B, 2, and 3.

Exemplary embodiments and their advantages are best understood by reference to FIGS. 1A/1B-FIG. 4, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Figure 1B:
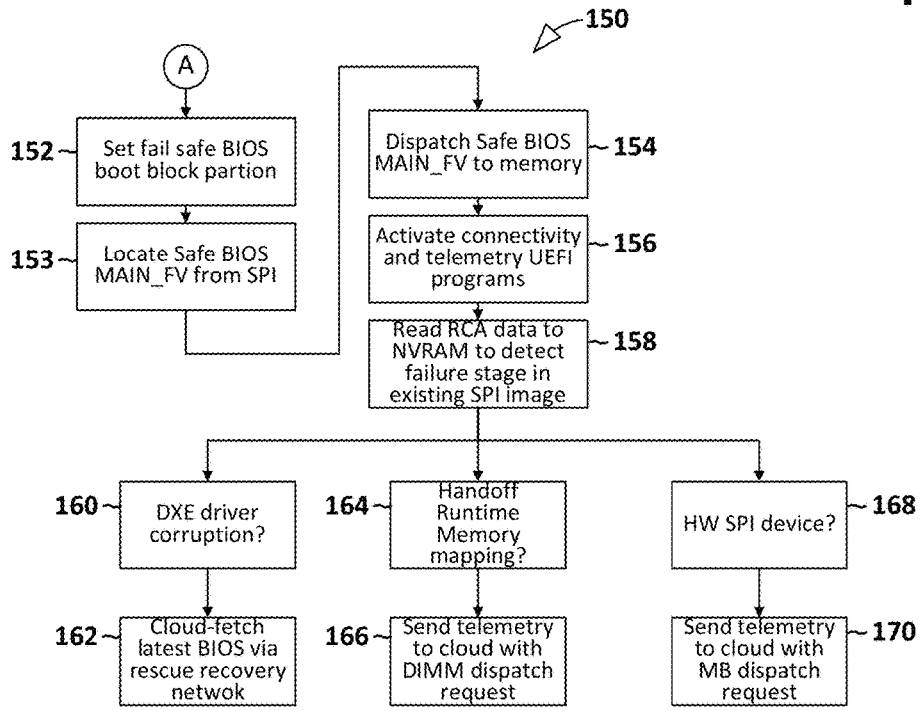

Referring now to the drawings, FIGS. 1A and 1B depict a flow diagram of an EC directed fail-safe boot method 100. The method 100 illustrated in FIGS. 1A and 1B leverages EC-managed, BIOS runtime telemetry to evaluate the BIOS state and implement an appropriate mitigation strategy following a POST error. If all local recovery and mitigation solutions supported by the existing main BIOS fail to resolve a NB/NP/NV state, the method 100 illustrated in FIGS. 1A & 1B invokes a dedicated boot partition, referred to herein as resilience firmware, to transition the system to a thin safe BIOS boot image. In at least some embodiments, the safe BIOS boot image evaluates failure state information including, as illustrative examples, boot stage e.g., DXE-DRIVER, and error failure, e.g., DXE-FV corrupted, and based on the failure state information, the safe BIOS boot image determines an appropriate action, such as fetching the latest BIOS image from the cloud or accessing telemetry data for backend analytics.

The illustrated method 100 initializes (operation 102) an embedded controller of a device or system under test to monitor (operation 104) for BIOS POST messages. If (operation 106) the BIOS POST message indicates a BIOS failure, i.e., the BIOS POST message is an error message, the illustrated method performs a sequence of recovery operations within the existing main BIOS image. If none of the main BIOS recovery operations resolve the failure, method 100 may then set and execute a fail-safe BIOS boot block 150 to identify appropriate action.

The mitigation and recovery operations illustrated in FIG. 1A include local recovery operations (110) including, e.g., a flash recovery tool, auto boot block feature, management engine (ME) firmware recovery tools and/or other local recovery tools, top-block swap operations (120) to switch from a primary boot block to a secondary boot block, and miscellaneous operations (130) including, e.g., an MBIST and/or a single mode SPI operation to configure SPI communication with a single data line. Other implementations may employ more, fewer, and/or different recovery operations. After each mitigation and recovery operation (110, 120, and 130) is performed, BIOS IQ (BIQ) indicators are evaluated (111, 121, and 131 respectively). If it is determined (blocks 112, 122, and 132) that the applicable recovery operations resolved the POST error, the illustrated method terminates. If the POST error has not been resolved, the illustrated method proceeds to the next recovery operation.

If the NB/NP/NV state is not resolved after invoking the main BIOS image recovery features (110-130), the illustrated method creates a fail-safe boot block (150) and stores fail-safe platform firmware to boot the system into a safe BIOS mode. The fail-safe boot block may be programmed at the factory and locked to prevent corruption of the fail-safe boot block.

The fail safe firmware depicted in FIG. 1B sets (block 152) the fail safe BIOS boot block partition, locates (block 153) the Safe BIOS main firmware volume (MAIN_FV) within SPI flash, and loads (block 154) the code stored in the safe BIOS MAIN_FV into memory. UEFI connectivity and telemetry programs may then be activated (block 156) and root cause analysis (RCA) data may be read (block 158) from NVRAM to detect the failure stage in the existing BIOS image. The illustrated method evaluates the RCA data and initiates an appropriate corrective action. FIG. 1B illustrates illustrative examples of evaluations and their corresponding corrective actions including cloud-fetching (block 162) the latest BIOS image in response to determining a DXE driver corruption issue (block 160); sending (block 166) telemetry data to the cloud with a DIMM dispatch request responsive to determining a runtime memory mapping handoff issue (block 164); and sending (block 170) telemetry to the cloud with a mother board dispatch request in response to determining a hardware issue with the SPI flash device (block 168). Again, the illustrated examples are illustrative rather than limiting and other implementations may employ more, fewer, and/or different pairs of evaluations and corrective actions.

Figure 2:
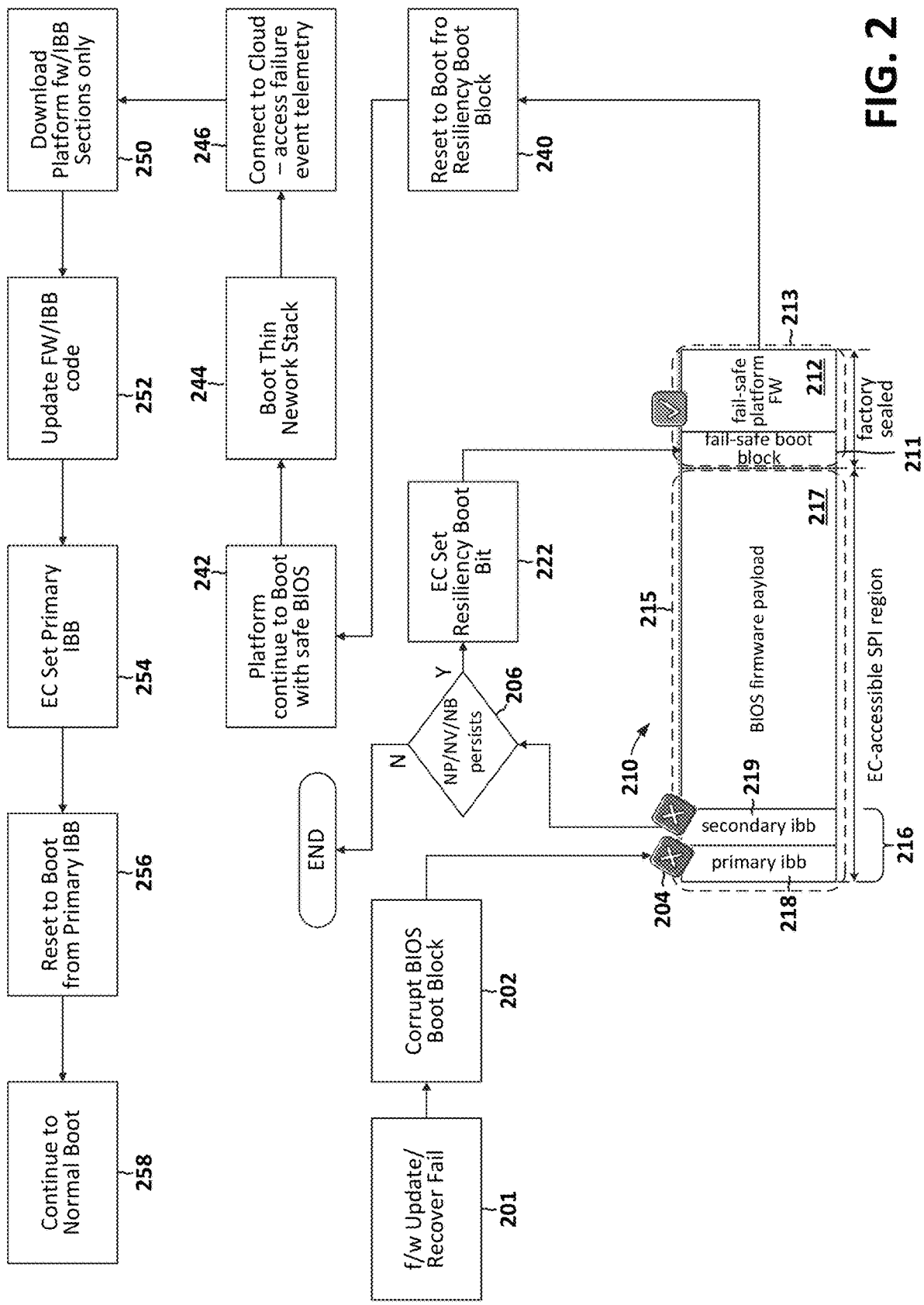
FIG. 2 depicts elements of a failsafe BIOS mode in accordance with disclosed teachings.

FIG. 2 illustrates a fail-safe boot block 211 and fail-safe platform firmware 212 stored to a resiliency partition 213 of SPI flash 210, which also includes a primary partition 215 including a BIOS boot block area 216 and main BIOS firmware 217. The BIOS boot block area 216 illustrated in FIG. 2 supports a top-block swap feature and implements a primary boot block 218 and a secondary boot block 219.

As depicted in FIG. 2, primary partition 215 resides in a region of SPI flash 210 that is accessible to the EC (not depicted in FIG. 2). In contrast, resiliency partition 213 may be one-time programmed at the factory and locked or sealed such that it can only be accessed in a factory mode. Sealing the resiliency partition 213 beneficially protects the partition from unauthorized access as well as improving the partition's lifetime by preventing or minimizing the number of program/erase cycles that the partition experiences.

Fail-safe boot block 211 is accessed to boot the platform to a safe BIOS mode following detection of a corrupt boot block (block 202), which may occur, for example, during a firmware update/recover (block 201) that is not resolved via main BIOS and/or local recovery procedures. As depicted in FIG. 2, the EC sets (block 222) a resiliency boot bit when a corrupted primary boot block (204) is detected and the secondary boot block is unable to resolve an NB/NP/NV state (block 206) of the system.

Following the setting of the resiliency boot bit, a reset is initiated (block 240) to boot (block 242) the platform from the resiliency boot block into a safe BIOS mode. As depicted in FIG. 2, the sequence may include the booting (block 244) of a thin network stack to support network communications including connecting (block 246) to cloud services to access and communicate telemetry on failure events for rapid root cause analysis. The sequence illustrated in FIG. 2 downloads (block 250) just the initial boot block (IBB) sections of the platform firmware to update (block 252) the IBB code. The EC then sets (block 254) the primary IBB and executes a reset (block 256) to boot the platform from the primary IBB, thereby enabling the platform to perform (block 258) with a normal boot.

The fail-safe boot block may also implement functionality to perform real time RCA and connect to the cloud to do telemetry on failure events and fetch a BIOS image that has parity with the existing BIOS image that is exhibiting POST issues.

Figure 3:
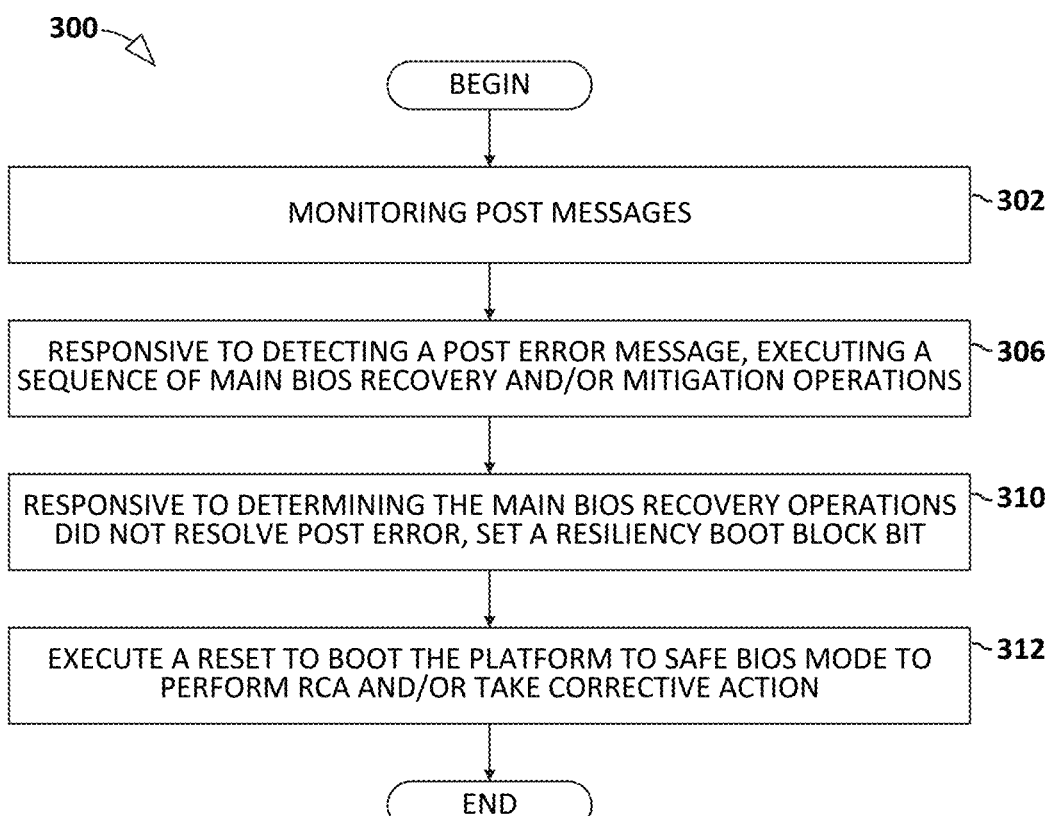
FIG. 3 illustrates a flow diagram of fail-safe boot features disclosed in FIGS. 1A, 1B, and 2.

FIG. 3 illustrates a flow diagram of an exemplary fail-safe boot block method 300 in accordance with the subject matter illustrated in FIGS. 1A, 1B, and 2. The illustrated method 300, which may include operations performed by the platform's EC, begins by monitoring (block 302) POST messages and, in response to detecting a POST error message, executing (block 306) a predetermined or dynamically ascertained sequence of main BIOS recovery operations including, in at least some embodiments, performing top-block swap recovery features supported by the platform. A commercially distributed example of top-block swap features is the Top-Block-Swap mode from Intel, but the illustrated operation 306 may execute any suitable secondary boot block mechanism.

If the main BIOS recovery operations fail to resolve the POST error issue, e.g., fail to resolve an NB/NP/NV state of the platform, a resiliency boot block bit is set (block 310) and a reset is executed (block 312) to boot the platform into the safe BIOS mode, as described above, for error analysis and corrective action.

Referring now to FIG. 4, any one or more of the elements illustrated in FIG. 1A through FIG. 3 may be implemented as or within an information handling system exemplified by the information handling system 400 illustrated in FIG. 4. The illustrated information handling system includes one or more general purpose processors or central processing units (CPUs) 401 communicatively coupled to a memory resource 410 and to an input/output hub 420 to which various I/O resources and/or components are communicatively coupled. The I/O resources explicitly depicted in FIG. 4 include a network interface 440, commonly referred to as a NIC (network interface card), storage resources 430, and additional I/O devices, components, or resources 450 including as non-limiting examples, keyboards, mice, displays, printers, speakers, microphones, etc. The illustrated information handling system 400 includes an EC 460 which may provide or support various system management functions and, in at least some implementations, keyboard controller functions. Exemplary system management functions that may be supported by EC 460 include thermal management functions supported by pulse width modulation (PWM) interfaces suitable for controlling system fans, power monitoring functions support by an analog-to-digital (ADC) signal that can be used to monitor voltages and, in conjunction with sense resistor, current consumption per power rail. This information could be used to, among other things, monitor battery charging or inform the user or administrator of potentially problematic power supply conditions. EC 460 may support battery management features to control charging of the battery in addition to switching between the battery and AC adapter as the active power source changes or monitoring the various battery status metrics such as temperature, charge level and overall health. EC 460 may support an Advanced Configuration and Power Interface (ACPI) compliant OS by providing status and notifications regarding power management events and by generating wake events to bring the system out of low power states.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method comprising:
    monitoring power on self-test (POST) messages of an information handling system;
    responsive to detecting a POST error message indicative of a POST error condition, executing a recovery sequence comprising a sequence of main basic input/output system (BIOS) recovery operations;
    responsive to determining the recovery sequence did not resolve the POST error condition, setting a resiliency boot block bit;
    executing a reset to boot the information handling system to a safe BIOS mode to determine a failure stage of the main BIOS; and
    taking corrective action based on the failure stage.

2. The method of claim 1, wherein the monitoring is performed by an embedded controller (EC) of the information handling system.

3. The method of claim 1, wherein the main BIOS recovery operations include at least one of: a memory built in self-test (MBIST) operation, a single bit serial peripheral interface (SPI) operation, and a top-block swap boot partition switch operation.

4. The method of claim 1, wherein determining the failure stage of the main BIOS includes:
    activating a unified extensible firmware interface (UEFI) telemetry program to obtain BIOS attribute data.

5. The method of claim 1, wherein taking corrective action includes at least one of:
    responsive to detecting a corrupted driver execution environment (DXE) driver, fetching a latest BIOS from a cloud-based store;
    responsive to a runtime memory mapping handoff error, sending telemetry to a cloud store and requesting a memory module dispatch; and
    responsive to determining a hardware issue with an SPI device, sending telemetry to a cloud store and requesting a motherboard dispatch.

6. An information handling system, comprising:
    a central processing unit (CPU);
    an embedded controller (EC); and
    a computer readable memory, accessible to the processor, including processor executable instructions that, when executed by the CPU, cause the system to perform operations including:
        monitoring power on self-test (POST) messages of an information handling system;
        responsive to detecting a POST error message indicative of a POST error condition, executing a recovery sequence comprising a sequence of main basic input/output system (BIOS) recovery operations;
        responsive to determining the recovery sequence did not resolve the POST error condition, setting a resiliency boot block bit;
        executing a reset to boot the information handling system to a safe BIOS mode to determine a failure stage of the main BIOS; and
        taking corrective action based on the failure stage.

7. The information handling system of claim 6, wherein the monitoring is performed by the EC of the information handling system.

8. The information handling system of claim 6, wherein the main BIOS recovery operations include at least one of: a memory built in self-test (MBIST) operation, a single bit serial peripheral interface (SPI) operation, and a top-block swap boot partition switch operation.

9. The information handling system of claim 6, wherein determining the failure stage of the main BIOS includes:
    activating a unified extensible firmware interface (UEFI) telemetry program to obtain BIOS attribute data.

10. The information handling system of claim 6, wherein taking corrective action includes at least one of:
    responsive to detecting a corrupted driver execution environment (DXE) driver, fetching a latest BIOS from a cloud-based store;
    responsive to a runtime memory mapping handoff error, sending telemetry to a cloud store and requesting a memory module dispatch; and
    responsive to determining a hardware issue with an SPI device, sending telemetry to a cloud store and requesting a motherboard dispatch.

11. A non-transitory computer readable medium including processor executable instructions that, when executed by a processor of an information handling system, cause the information handling system to perform operations including:
    monitoring power on self-test (POST) messages of the information handling system;
    responsive to detecting a POST error message indicative of a POST error condition, executing a recovery sequence comprising a sequence of main basic input/output system (BIOS) recovery operations;

responsive to determining the recovery sequence did not resolve the POST error condition, setting a resiliency boot block bit;

executing a reset to boot the information handling system to a safe BIOS mode to determine a failure stage of the main BIOS; and taking corrective action based on the failure stage.

12. The non-transitory computer readable medium of claim 11, wherein the monitoring is performed by an embedded controller (EC) of the information handling system.

13. The non-transitory computer readable medium of claim 11, wherein the main BIOS recovery operations include at least one of: a memory built in self-test (MBIST) operation, a single bit serial peripheral interface (SPI) operation, and a top-block swap boot partition switch operation.

14. The non-transitory computer readable medium of claim 11, wherein determining the failure stage of the main BIOS includes:

activating a unified extensible firmware interface (UEFI) telemetry program to obtain BIOS attribute data.

15. The non-transitory computer readable medium of claim 11, wherein taking corrective action includes at least one of:

responsive to detecting a corrupted driver execution environment (DXE) driver, fetching a latest BIOS from a cloud-based store;

responsive to a runtime memory mapping handoff error, sending telemetry to a cloud store and requesting a memory module dispatch; and responsive to determining a hardware issue with an SPI device, sending telemetry to a cloud store and requesting a motherboard dispatch.

* * * * *